May 8, 1928. 1,668,954
H. FAUROT
PISTON RING
Original Filed Sept. 14, 1922
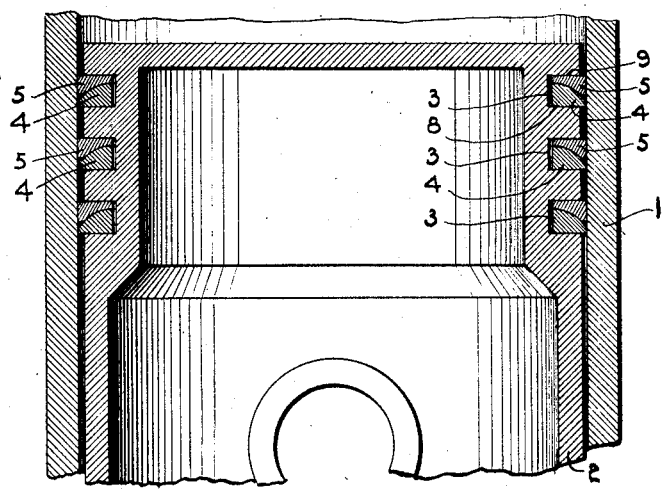
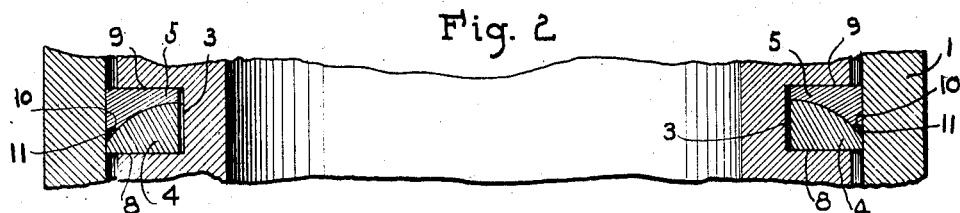
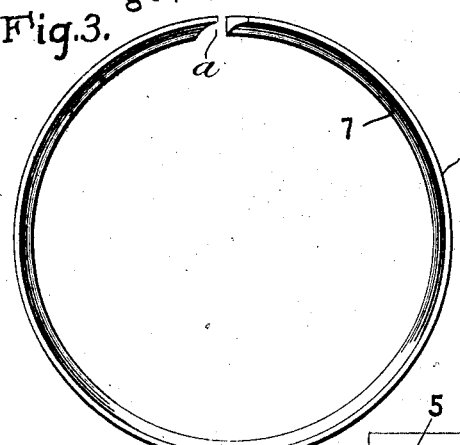
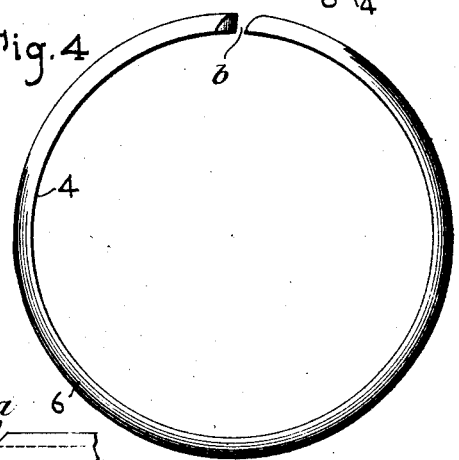
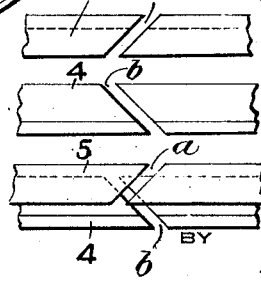
Henry Faurot
INVENTOR
WITNESSES Patented May 8, 1928.

1,668,954

UNITED STATES PATENT OFFICE.

HENRY FAUROT, OF CHICAGO, ILLINOIS.

PISTON RING.

Application filed September 14, 1922, Serial No. 588,219. Renewed November 8, 1927.

This invention relates to piston rings adapted to be used in steam engines, and air compressors, but particularly designed for internal combustion engines.

It has been proposed to provide a piston ring formed of two sections divided by an oblique line, but experiments have shown that such a ring cannot adjust itself to ring channels which have worn wider at some point of their circumference, causing an imperfect bearing or contact between the meeting faces of the sections and permitting oil and pressure to pass by the ring sections in the channels.

Furthermore, any ring having an oblique line for a meeting face is prone to act as a wedge when too great a friction is set up in the cylinder by insufficient lubrication, or overheating of the cylinder. By forcing the wedge shaped edge of the outside section of the ring between the piston and cylinder wall, as the pistons wear smaller, this danger is increased.

I overcome the objections by providing a ring formed of two ring sections, having their meeting faces curved coincidently, that is, one of the ring sections is provided with a concave meeting face to seat upon the convexed face of the other ring section, thereby eliminating any possible chance to wedge. The curved faces of the two ring sections adjust themselves to any variation in ring channel widths, and still maintain a bearing the full circumference of their meeting faces. This will prevent any passage of oil or pressure through the ring channels.

Furthermore, the ring section provided with the convex meeting face is cut on a slightly larger diameter than the ring section having the concave meeting face, which is cut substantially to the diameter of the cylinder, so that when these ring sections are in position in the packing channel, the convex section will expand and force the outer periphery of the concave section into firm engagement with the cylinder wall, and also produce sufficient pressure between the bases of the ring sections and sides of the ring channel to insure a perfect bearing to be maintained in their full circumference.

Another feature of this ring is the provision of an annular groove between the outer peripheries of the ring sections in which lubricating oil may collect and insure lubrication of the cylinder wall.

Another feature of the ring is the provision of each ring section with a miter cut or split, the miter cut of one section being at substantially 90° of the miter cut of the other section, so that when the two sections are fitted together, and should the miter cuts come opposite each other a broken joint would be provided.

An advantage of this ring over all others is the quick seating feature obtained by the narrow edge of the convex or inside ring section, the narrow edge wearing much faster than a wider surface, causes the convex section containing the narrow edge to conform to any irregularity of the cylinder bore, insuring good compression and immediately eliminating excess oil.

Moreover, an advantage over other rings is that the two ring sections are free to float in the packing channel, and do not require the use of dowel pins to insure the openings in the two sections not working in registry, for this is overcome in this ring by cutting the concave and convex sections with opposite angles.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:

Figure 1 is a vertical section of a piston and cylinder with my improved piston ring mounted in the packing channel;

Figure 2 is a detail view in section on a larger scale;

Figure 3 is a plan view of one of the ring sections provided with the concave meeting face;

Figure 4 is a plan view of the other ring section having the convex meeting face.

Figure 5 is a view representing the miter cuts or splints in the two ring sections, and the manner in which the miter cuts should they come opposite each other form a broken joint.

Referring to the drawing, 1 indicates the cylinder of an internal combustion engine;

provided with a reciprocating piston 2 having packing channels or grooves 3, annularly disposed in the upper end of the piston.

My improved piston ring comprises a pair of split ring sections 4 and 5, seated upon each other and disposed within the grooves 3. Ring section 4 has a convex meeting face 6 curved coincidently with the concave meeting face 7 of ring section 5, so that when the sections are seated upon or against each other, a snug fit will be provided between the curved faces of the ring sections, so that if any wear should take place between the meeting faces of the ring sections, the wear will be even and continuous throughout the full extent of the meeting faces of said ring sections.

The miter cut $a$ of the ring 5 is inclined in a different direction from the miter cut $b$ of ring 4 (see Fig. 5) the two cuts being disposed at an angle of substantially 90° to each other, so that when the two ring sections are applied, and should the cut of one ring section come opposite the cut of the other ring section, the two ring sections will overlap, thereby providing a broken joint, so that the thin feather edge of the convex section 4 would seal the miter cut in the outside section 5, and thus prevent the escape of pressure at this point.

The concave section 5 of the packing ring is turned down to substantially the inner circumference of the cylinder, and since the convex section 4 furnishes all, or practically all, of the tension for maintaining the ring sections in engagement with the cylinder walls and ring channels, it will not be necessary, as is usual with piston rings, for the concave section to wear itself down to conform to the curvature of the cylinder walls, but by virtue of the convex section conforming immediately to the cylinder walls when installed, a high efficiency of compression is insured at the start. It will be noted that the concave section bears at its wide edge on the cylinder wall, its narrow edge being located in the ring channel, whereas with the convex section the narrow edge rides on the cylinder walls and the wide edge faces the bottom of the ring channel.

Because of the loose fitting of the rings 4 and 5 and consequent great expansion in the channel, the packing will continue to function properly, because of the fact that all bearing and contact this ring is required to make to function properly, is caused by tension of the ring sections in several different directions which eliminates all possible chance of the ring sections sticking in the packing channel and rendering them inactive from different causes, whereas under the same conditions an ordinary ring would freeze in position and become inactive from the heat.

Section 4 has a flat base 8 engaging the lower side of the packing channel 3, while section 5 has a flat base 9 engaging the upper side of said channel. It should be borne in mind that contact between the ring sections and the ring channel is exclusively by tension between the sections and the sides of the ring channel, and the necessary contact between the ring sections is constantly maintained through such tension.

Furthermore, by the use of this ring the piston slap occasioned by loose pistons will be lessened, since the convex section 4 having a larger diameter than the concave section 5, will expand outwardly from the ring channel and force the concave section apart, thus producing a powerful pressure between the bases of the ring sections and the sides of the channel. This pressure naturally creates friction between the rings and the sides of the ring channel, thereby furnishing a powerful resistance against any effort to force the ring sections inwardly into the channel.

It will be noted that the coincident surfaces 6 and 7 are in the shape of a portion of an anchor ring surface, the cross section of which has a radius considerably less than the radius of the piston, the center of said cross section being substantially in alinement with the bottom of the channel 3, but beyond the side of the channel. It follows then that while the tension of the inner section 4 causes the ring sections to engage the sides of the channel with considerable pressure, this pressure is exceeded by the outward or radial pressure of the ring, so that the latter always forms a close contact with the wall of the cylinder.

The concave section 5 has a miter cut forming a portion 10 overhanging the convex ring 4 and defining an annular groove 11 between the peripheries of the two rings, which grooves gather oil and assist greatly in assuring lubrication of the cylinder walls. The precise shape of the groove is immaterial. A small amount of carbon will collect in this groove at the point where the miter cut of the concave section 5 terminates, and will seal the same and assist the curved faces in holding pressure and will prevent the escape of oil past the rings.

In inserting the ring, the convex section will be expanded sufficiently to embrace the piston and then forced downwardly until it seats within the channel. The concave section is similarly forced into its place in the channel and onto the convex section. By reason of the larger diameter of the convex section and the adaptability of the concave section to conform instantly to the curvature of the cylinder walls, the piston will be held centrally of the cylinder, while the rings will form an effective seal between the piston and the cylinder walls.

What is claimed is:—

A piston ring comprising two split ring sections having coincident contacting faces, said faces being in the shape of a portion of an anchor ring surface, the cross section of which has a radius considerably less than the radius of the piston, the center of said cross section being substantially in alinement with the inner side of the piston ring but beyond the plane of the piston ring, the inner ring section being so tensioned as to have a tendency to expand outwardly against the outer section and cause the piston ring to closely engage the sides of the channel and the wall of the cylinder.

In testimony, that I claim the foregoing as my own, I have hereto affixed my signature.

HENRY FAUROT.